US010405191B2

(12) United States Patent
Mushunuri et al.

(10) Patent No.: US 10,405,191 B2
(45) Date of Patent: Sep. 3, 2019

(54) METHOD AND SYSTEM FOR SHARING OF UNLICENSED SPECTRUM

(71) Applicant: Tata Consultancy Services Limited, Mumbai (IN)

(72) Inventors: Visali Mushunuri, Bangalore (IN); Bighnaraj Panigrahi, Bangalore (IN); Hemant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/891,610

(22) Filed: Feb. 8, 2018

(65) Prior Publication Data

US 2018/0227769 A1 Aug. 9, 2018

(30) Foreign Application Priority Data

Feb. 8, 2017 (IN) .............................. 201721004578

(51) Int. Cl.
*H04W 16/14* (2009.01)
*H04W 72/12* (2009.01)
*H04W 74/08* (2009.01)

(52) U.S. Cl.
CPC ....... *H04W 16/14* (2013.01); *H04W 72/1252* (2013.01); *H04W 72/1273* (2013.01); *H04W 74/085* (2013.01); *H04W 74/0816* (2013.01)

(58) Field of Classification Search
CPC . H04W 16/14; H04W 24/00; H04W 72/1252; H04W 72/1273; H04W 74/0816; H04W 74/085

USPC .......................................................... 370/329
See application file for complete search history.

(56) References Cited

U.S. PATENT DOCUMENTS

| 2016/0233989 | A1  | 8/2016  | Belghoul et al. |
| 2016/0278074 | A1* | 9/2016  | Yang ..................... H04L 1/1812 |
| 2016/0338054 | A1* | 11/2016 | Oh ..................... H04W 74/0841 |
| 2017/0290059 | A1* | 10/2017 | Karaki .............. H04W 74/0816 |
| 2018/0027589 | A1* | 1/2018  | Yang ..................... H04W 16/14 370/329 |
| 2018/0191547 | A1* | 7/2018  | Mukherjee .......... H04L 27/2692 |

(Continued)

FOREIGN PATENT DOCUMENTS

WO  WO-2016/071021  5/2016
WO  WO-2016/072908  5/2016

*Primary Examiner* — Phong La
(74) *Attorney, Agent, or Firm* — Finnegan, Henderson, Farabow, Garrett & Dunner LLP

(57) ABSTRACT

The present application provides a method and system for sharing of unlicensed spectrum. The disclosed method and system when implement improves the spectral efficiency of LTE users and also improves the overall performance of LAA and Wi-Fi users. A BS senses the channel for any ongoing transmissions for a CCA period which is equal to DIFS time period of Wi-Fi. If the channel is busy (CCA-busy), it enters into back-off stage by selecting a uniform random number from [0, $C_0-1$] as the back-off counter, where $C_0$ is the fixed congestion window size. If the channel is free for a CCA period (CCA-idle), the back-off counter gets decremented by unity until it reaches zero. Once the back-off counter reaches zero, LAA again senses and schedules its down-link transmissions for a maximum channel occupancy period, provided the channel is free.

8 Claims, 13 Drawing Sheets

(56) References Cited

U.S. PATENT DOCUMENTS

| | | | |
|---|---|---|---|
| 2018/0220457 A1* | 8/2018 | Koorapaty | H04W 74/0808 |
| 2018/0235006 A1* | 8/2018 | Li | H04W 74/0808 |
| 2018/0310334 A1* | 10/2018 | Mukherjee | H04L 5/0053 |
| 2018/0317256 A1* | 11/2018 | Um | H04L 5/00 |

* cited by examiner

METHOD AND SYSTEM FOR SHARING OF UNLICENSED SPECTRUM

PRIORITY CLAIM

This U.S. patent application claims priority under 35 U.S.C. § 119 to: India Application No. 201721004578, filed on Feb. 8, 2017. The entire contents of the aforementioned application are incorporated herein by reference.

TECHNICAL FIELD

The present application generally relates to wireless communications. Particularly, the application provides a method and system for sharing of unlicensed spectrum.

BACKGROUND

With increasing data rate demands among users, there is a substantial increase in demand for the licensed spectrum. However, the cellular licensed spectrum is already congested. Therefore to accommodate more number of users and improve the spectral efficiency, different methods such as cell sectoring, cell splitting, small cell deployment, relaying, etc. have been proposed in the past. However, these methods are still fall short of the desired data rate. Since the licensed band is unable to bring any more addition in data rate, the focus is being shifted to the use of unlicensed band of over 500 MHz around 5 GHz which is either unused or sparsely used.

In this direction, Licensed Assisted Access (LAA) under Long Term Evolution (LTE) uses unlicensed band at 5 GHz in addition to the licensed band allocated to LTE. Since it is an unlicensed band and every user is free to use this band, collision between transmissions can occur which reduces the effective data rate. Since WiFi and other similar technologies back-off from transmission if they sense the channel as busy, LAA should also refrain from transmission in case of contention or collision. Moreover as LAA uses a centralized scheduled Medium Access Control (MAC) protocol in comparison to the distributed MAC protocols of WiFi and other LAA should not completely grab the channel and starve WiFi or any other users.

In view of the above it becomes clear that while the use of unlicensed band is unavoidable, it becomes of paramount importance that fair co-existence of LAA and WiFi in unlicensed band

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for sharing of unlicensed spectrum using listen before talk (LBT) technique.

In one implementation the application provides a computer implemented method for sharing of unlicensed spectrum using listen before talk (LBT) technique; said method comprising processor implemented steps of checking, a buffer for data to be transmitted using a LAA base station (BS). Next a channel is sensed for a clear channel assessment (CCA) period using at least one sensor operatively coupled to the BS wherein the CCA period is equal to Distributed Inter Frame Space (DIFS) period for Wi-Fi. In accordance with the method disclosed herein the BS enters into a linear backoff stage by selecting a random number from fixed congestion window size when the channel is sensed busy by the at least one sensor. Alternatively the BS schedules users and stars data transmission for a maximum channel occupancy period wherein the maximum channel occupancy period is equal to a predefined channel occupancy period when the channel is sensed free by the at least one sensor. According to the next step of the disclosed method the channel is released after the predefined channel occupancy period to be shared, such that the channel is released; and lastly the method disclosed comprises sensing the channel for the CCA period to transmit a second data in the buffer.

In another aspect, the present application provides a system (102) for sharing of unlicensed spectrum using listen before talk (LBT) technique; comprising a processor, a memory, a LAA base station (BS) and at least one sensor operatively coupled with the BS. The disclosed system comprising the base station (BS) configured to check, a buffer for data to be transmitted, further the system comprises at least one sensor operatively coupled to the BS configured to sense a channel for a clear channel assessment (CCA) period wherein the CCA period is equal to Distributed Inter Frame Space (DIFS) period for Wi-Fi. Further the BS configured to enter into a linear backoff stage by selecting a random number from fixed congestion window size when the channel is sensed busy by the at least one sensor. In an aspect the BS enters into back-off stage by selecting a uniform random number from $[0, C_0-1]$ as the back-off counter such that $C_0$ is the fixed congestion window size and wherein the fixed congestion window size can be tuned based on usage of the channel.

In yet another aspect, a non-transitory computer-readable medium having embodied thereon a computer program for executing a method for sharing of unlicensed spectrum using listen before talk (LBT) technique; wherein the method includes steps of checking, a buffer for data to be transmitted using a LAA base station (BS). Next a channel is sensed for a clear channel assessment (CCA) period using at least one sensor operatively coupled to the BS wherein the CCA period is equal to Distributed Inter Frame Space (DIFS) period for Wi-Fi. In accordance with the method disclosed herein the BS enters into a linear backoff stage by selecting a random number from fixed congestion window size when the channel is sensed busy by the at least one sensor. Alternatively the BS schedules users and stars data transmission for a maximum channel occupancy period wherein the maximum channel occupancy period is equal to a predefined channel occupancy period when the channel is sensed free by the at least one sensor. According to the next step of the disclosed method the channel is released after the predefined channel occupancy period to be shared, such that the channel is released; and lastly the method disclosed comprises sensing the channel for the CCA period to transmit a second data in the buffer.

The BS further configured to schedule users and staring data transmission for a maximum channel occupancy period wherein the maximum channel occupancy period is equal to a predefined channel occupancy period when the channel is sensed free by the at least one sensor. In accordance with the system (102) disclosed herein the BS further configured to release the channel after the predefined channel occupancy period to be shared. Also according to an embodiment of the system the BS further configured to initiate the at least one sensor to sense the channel for the CCA period to transmit a second data in the buffer.

It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION

Figure 1:
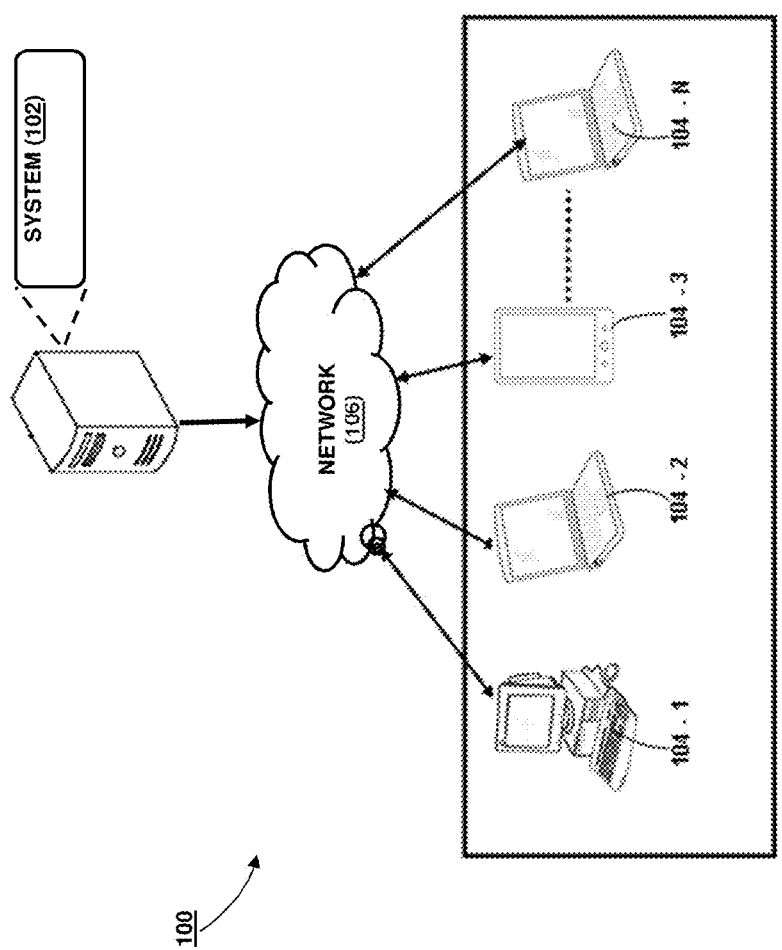
FIG. 1 illustrates a network implementation of a system for sharing of unlicensed spectrum using listen before talk (LBT) technique, in accordance with an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present application provides a computer implemented method and system for measuring end user video quality.

The present application provides a computer implemented method and system for sharing of unlicensed spectrum using listen before talk (LBT) technique. Referring now to FIG. 1, a network implementation 100 of a system 102 for sharing of unlicensed spectrum using listen before talk (LBT) technique is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. In another embodiment, it may be implemented as custom built hardware designed to efficiently perform the invention disclosed. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
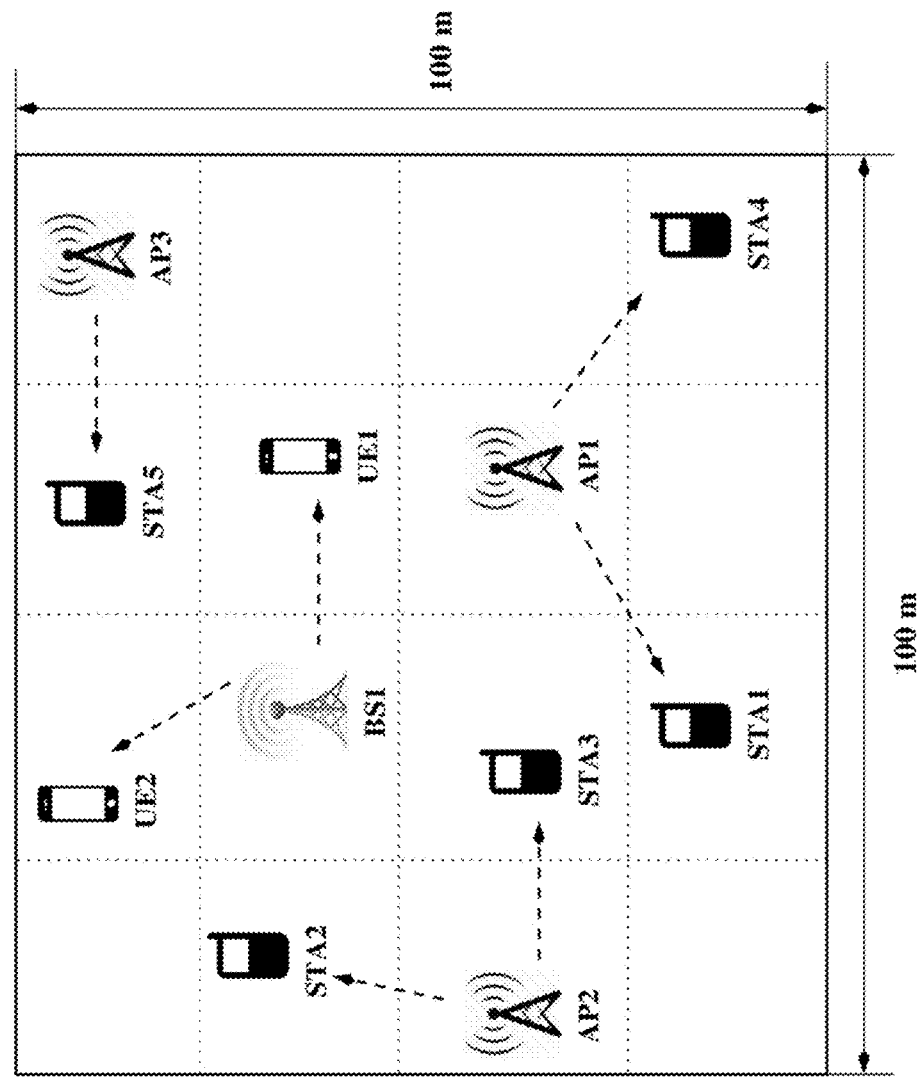
FIG. 2 shows diagram illustrating a system configuration of the system for sharing of unlicensed spectrum using listen before talk (LBT) technique, in accordance with an embodiment of the present subject matter.

In one embodiment the present invention, referring to FIG. 2 an area with multiple WiFi APs and a single LAA BS deployed at random locations. WiFi APs operate at 5 Ghz unlicensed band and LAA system operates at both licensed and 5 GHz unlicensed band. Each WiFi AP supports multiple WiFi users or WiFi Stations (STAs), placed at random in the vicinity of their APs. LAA supports multiple LTE Users (UEs) located at random in the vicinity of the LAA BS. All WiFi STAs follow DCF as defined in IEEE 802.11.

The channel is sensed using the channel sensing mechanism under DCF, detailed information and analysis on channel sensing is disclosed in the following paragraphs. The system as claimed herein uses various hardware such as LAA BS, sensors, processors and memory to implement the following mechanism for efficient sharing of unlicensed spectrum between users.

The DCF mechanism adopted by WiFi is modeled as a two dimensional Markov Model (i, k) where i and k are stochastic processes representing back-off stage and back-off counter respectively. It is assumed that each STA regardless of the number of retransmissions it suffered, collides with other STAs' transmissions with collision probability $p_w$. Whenever there is a collision, back-off stage i is incremented by unity ($0 \leq i \leq m$, m is the maximum back-off stage) and the back-off counter k takes random value between [0, $CW_i-1$], where, $CW_i=2^i W_{min}$. $W_{min}$ is the minimum congestion window size. The channel is sensed continuously and upon finding the channel free for a Clear Channel Assessment (CCA) period, the back-off counter is decremented by unity if it finds channel free in each slot. Once the back-off counter reaches zero, transmission can start again. On successful transmission, the back-off stage reset to zero. The closed form expression of stationary probability for this Markov chain, $b_{i,k}$ is given by equation 1 below.

$$b_{i,k} = \frac{CW_i - k}{CW_i} b_{i,0}, \; i = [0, m], k \in [0, CW_i - 1] \qquad (1)$$

Normalization conditions are imposed and with further analysis, $b_{0,0}$ is obtained as a function of $p_w$ as per equation (2):

$$b_{0,0} = \frac{2(1 - 2p_w)(1 - p_w)}{(1 - 2p_w)(W_{min} + 1) + p_w W_{min}(1 - (2p_w)^m)} \qquad (2)$$

Therefore, the channel access probability $y_w$ of each node is expressed as a function of collision probability $p_w$, minimum congestion window size $W_{min}$, and maximum number of back-off stages m as per equation (3):

$$\gamma_w = \sum_{i=0}^{m} b_{i,0} = \frac{b_{0,0}}{1 - p_w}, \; = \frac{2(1 - 2p_w)}{(1 - 2p_w)(W_{min} + 1) + p_w W_{min}(1 - (2p_w)^m)} \qquad (3)$$

According to an implementation of the system proposed herein both LAA and WiFi co-exist and contend for the same unlicensed channel. WiFi uses a distributed channel access mechanism, whereas LAA uses a centralized entity (BS) for channel sensing and scheduling. BS serves as the sole representative of all the UEs; BS senses the unlicensed channel before accessing and blocking the channel for down-link communications.

Figure 3:
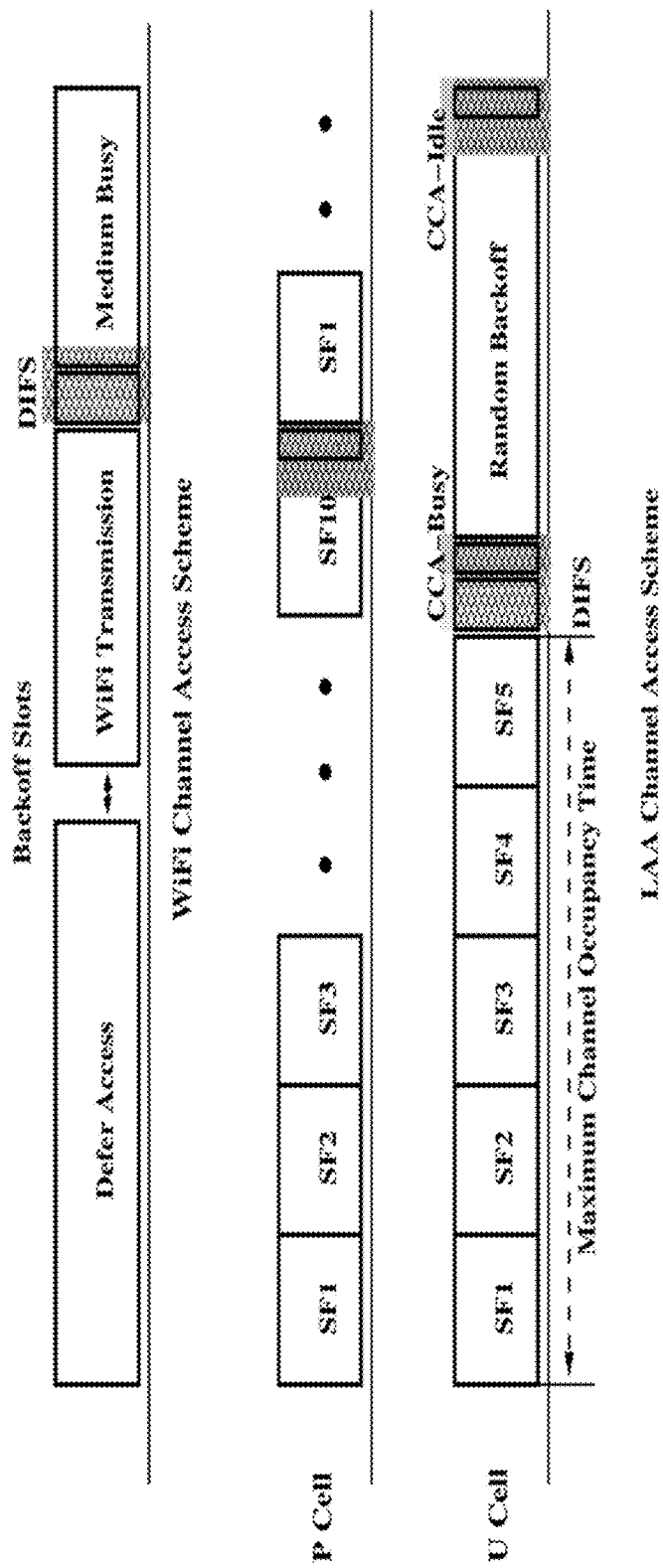
FIG. 3 shows a LAA (license assisted access) channel access scheme using LBT (Listen before talk) in LAA.

Since the channel access mechanism of LAA can impact the performance of LAA as well as WiFi system, an efficient LBT technique which not only should ensure higher throughput to LAA users but also should not hamper any other co-located WiFi users' performance. Since LAA is used to improve the channel usage, linear back-off is used instead of exponential back-off in order to improve the performance. With fixed size congestion window, number of back-off stages in LAA, m=1. In may be noted that, uplink transmissions in LAA are performed on Licensed uplink Subframes (LSF) and Unlicensed Subframes (USF) are used only for the downlink transmissions (as illustrated in FIG. 3). Both LSF and USF are of duration 1 ms.

According to an aspect of the present invention the BS senses the channel for any ongoing transmissions for a CCA period which is equal to Distributed Inter Frame Space (DIFS) time period of WiFi. In an embodiment when the channel is busy (CCA-busy), the BS enters into back-off stage by selecting a uniform random number from $[0, C_0-1]$ as the back-off counter, where $C_0$ is the fixed congestion window size. The value of $C_0$ can be tuned based on the channel usage of WiFi users. Every time the LAA BS senses a free channel for a CCA period (CCA-idle), the back-off counter gets decremented by unity until it reaches zero. Once the back-off counter reaches zero, LAA again senses and schedules its down-link transmissions for a maximum channel occupancy period, provided the channel is free.

As per the standards maximum channel occupancy period can be set to any value between 4 to 13 Unlicensed Sub Frames. In an embodiment a time period of 7 ms may be set as predefined channel occupancy period. After transmission, BS releases the channel even if no other WiFi users are contending for the channel; this is to ensure fair opportunity to WiFi users for transmissions. This process continues and LAA BS needs to sense again for any other transmission.

Figure 4:
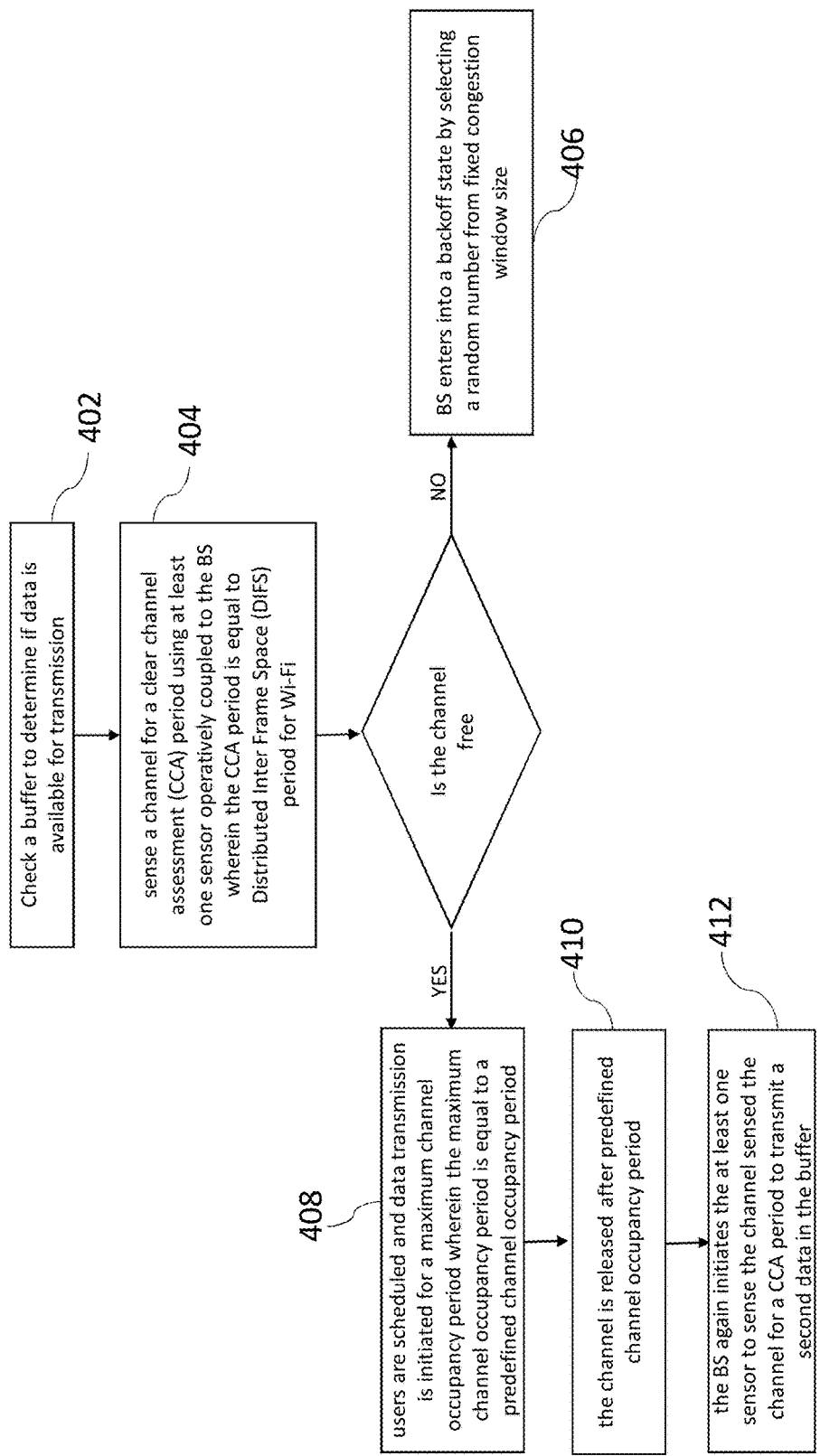
FIG. 4 shows a flowchart illustrating the method for sharing of unlicensed spectrum using listen before talk (LBT) technique, in accordance with an embodiment of the present subject matter

Referring now to FIG. 4 a flowchart illustrating the method for sharing of unlicensed spectrum. As illustrated in the FIG. 4 at the step 402, a buffer is checked to determine if data is available for transmission. Next at the step 404 when data is determined as available, a channel is sensed for a clear channel assessment (CCA) period using at least one sensor operatively coupled to the BS wherein the CCA period is equal to Distributed Inter Frame Space (DIFS) period for Wi-Fi.

As illustrated at the step 406 when it is sensed by the at least one sensor that the channel is not free the BS enters into a linear backoff state by selecting a random number from fixed congestion window size. In an embodiment the BS enters into back-off stage by selecting a uniform random number from $[0, C_0-1]$ as the back-off counter such that $C_0$ is the fixed congestion window size and wherein the fixed congestion window size can be tuned based on usage of the channel.

Further as illustrated at the step 408 in flowchart of FIG. 4, when the at least one sensor sense the channel as free, users are scheduled and data transmission is initiated for a maximum channel occupancy period wherein the maximum channel occupancy period is equal to a predefined channel occupancy period.

Next at the step 410, the channel is released after predefined channel occupancy period, such that the channel is released for the DIFS period.

Finally at the step 412 the BS again initiates the at least one sensor to sense the channel sensed the channel for a CCA period to transmit a second data in the buffer.

Figure 5:
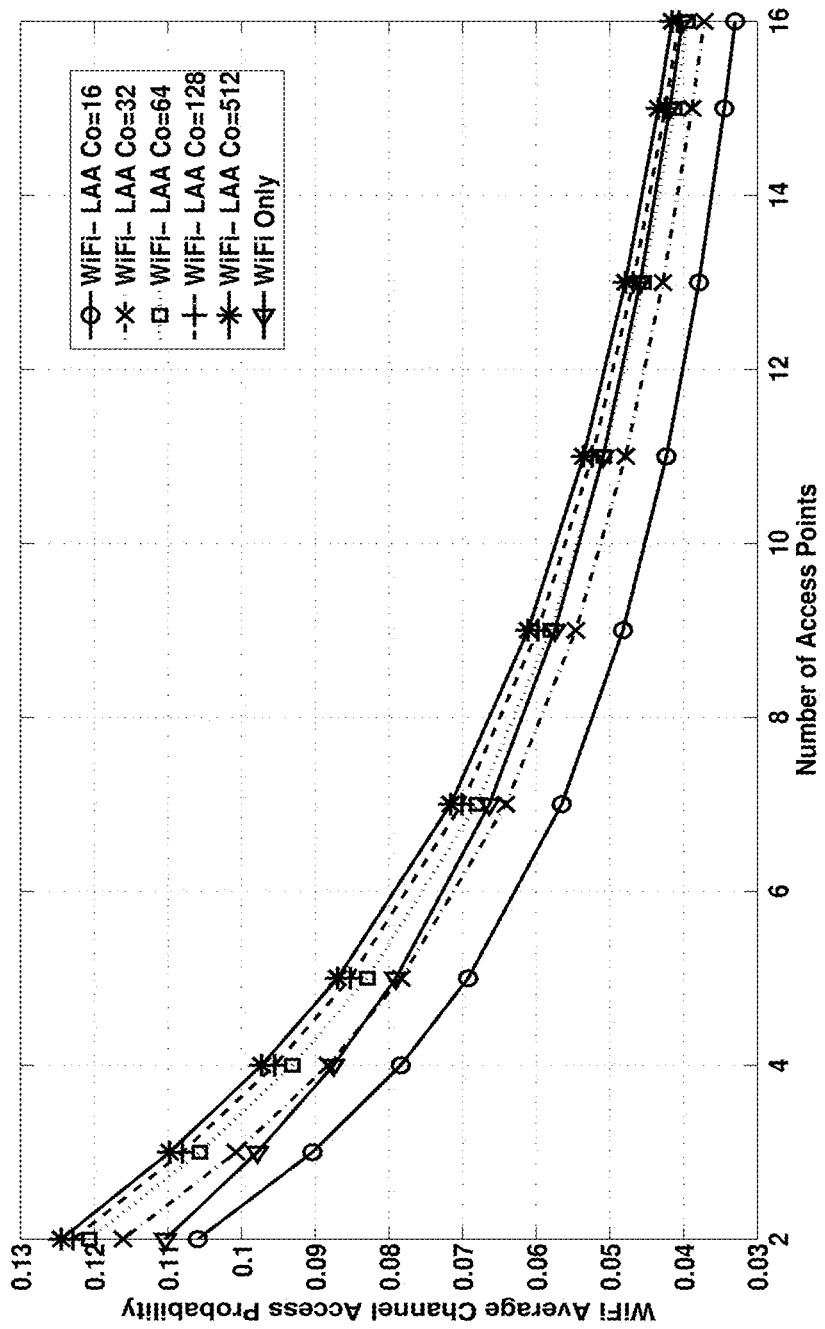
FIG. 5 shows a Markov Chain Model of LAA, in accordance with an embodiment of the present subject matter.

Referring now to FIG. 5 a representation of state transitions in the form of a one dimensional Markov model is illustrated. This model is used to analyze the throughput performance of LAA. Each state of this chain is a back-off counter value k and two consecutive back-off counter states are represented as k and k+1 respectively. Further the collision probability of each packet transmitted ($p_i$) shown in FIG. 5 is constant and independent.

The one-step transition probabilities at state k as a function of previous back-off state k+1 or the initial state without any back-off are represented as per equation (4):

$$\begin{cases} Pr[k/k+1] = 1, \\ Pr[k/0] = (1-p_l) + p_l\left(\frac{1}{C_0}\right) \end{cases} \quad (4)$$

Therefore, the stationary distribution of the chain can be presented as $b_k$ in accordance with equation (5) below:

$$b_k = b_{k+1} + \left[(1-p_l) + p_l\left(\frac{1}{C_0}\right)\right]b_0 \quad (5)$$

By imposing normalization condition and deriving an expression for state $b_0$ in terms of $p_i$, $b_0$ can be represented as per equation (6).

$$b_0 = \frac{2C_0}{[(1-p_i)C_0 + p_i](C_0+1)} \quad (6)$$

In accordance with the subject matter disclosed herein the transmission starts once the back-off counter reaches zero, the channel access probability of BS, $y_l$ is equal to state zero of Markov chain.

$$y_l = b_0 = \frac{2C_0}{[(1-p_i)C_0 + p_i](C_0+1)} \quad (7)$$

The collision probabilities for WiFi and LAA users can be represented in terms of channel access probabilities $y_w$ and $y_i$ of WiFi and LAA. Collision occurs if two or more stations access the channel at the same time. Therefore, the collision probability of WiFi can be written as illustrated in equation 8 below.

$$p_w = 1-(1-y_w)^{n-1}(1-y_i), p_w = 1-(1-y_w)^n \quad (8)$$

The above equations (3), (7) and (8) form a system of non-linear equations which may be solved for $p_w$, $p_i$, $y_w$ and $y_i$. Thus, collision probabilities and channel access probabilities for the combined system (e.g.: LAA and WiFi co-exist) can be obtained by solving the above mentioned equations.

Further in an aspect the saturation throughput of co-existence of LAA and WiFi is calculated in the manner illustrated in the following paragraphs.

The saturation throughput for WiFi and LAA can be calculated respectively as, per equation (9) where, L is the length of the payload and $P_{tr}^w$, $P_{tr}^l$, are the transmission probability of WiFi and LAA BS respectively $$T_W = \frac{P_{tr}^w P_s^w (1-P_{tr}^l)L}{S_{state}} \quad (9)$$

$$T_L = \frac{P_{tr}^l P_s^l (1-P_{tr}^w)L}{S_{state}}$$

Further the transmission probability of WiFi APs and LAA BS respectively, are expressed as per equation (10).

$$P_{tr}^w = 1-(1-y_w)^n,$$

$$P_{tr}^w = y_l \quad (10)$$

Also the success probabilities $P_s^w$ and $P_s^l$ of WiFi and LAA are calculated according to equation 11 below:

$$P_s^w = \frac{n\gamma_w(1-(1-\gamma_w)^{n-1})}{P_{tr}^w}, \quad (11)$$

$$P_s^l = \frac{\gamma_l}{P_{tr}^l} = 1.$$

Based on the above equations, in accordance to the system and method disclosed herein, the total saturation throughput for the system is calculated as per equation 12.

$$T = T_W + T_L \quad (12)$$

Also, the total expected time spent in transmission can be explained in four different states as given in (13) below. $S_W$ is the state in which only WiFi AP transmits whereas LAA BS doesn't transmit that results in either successful transmission of WiFi or an internal collision among WiFi APs. $S_L$ is the state in which WiFi APs don't transmit whereas LAA BS transmits.

In the instant illustration only one LAA BS is considered, internal collisions don't happen but is specified in the equation (14) for the sake of completeness. $S_{idle}$ is the state in which both LAA and WiFi doesn't transmit which is an idle state. $S_{cross}$ the state in which both LAA and WiFi are transmitting and results in a collision between the two systems. Where $\sigma_{idle}$ is the idle time slot during which both LAA BS and WiFi AP are not transmitting. Transmission times $T_{s,w}$ and $T_{s,l}$ are the successful transmission time needed to transmit a packet in only WiFi and only LAA transmission cases respectively. Similarly, $T_{c,w}$ is the collision time for WiFi when two or more WiFi stations are transmitting and $T_{c,l}$ is the collision time for LAA which is zero in this case as only one LTE BS is considered. $T_{c,m}$ is the collision time when LAA BS and WiFi AP are transmitting simultaneously which is the maximum of $T_{c,w}$ and $T_{c,l}$.

$$S_{state} = S_W + S_L + S_{idle} + S_{cross}, \quad (13)$$

where, $S_L = P_{tr}^l(P_{tr}^{w'}P_s^l T_{s,l} + P_{tr}^{w'}P_s^l T_{c,l})$,
$S_w = P_{tr}^w(P_{tr}^{l'}P_s^l T_{s,w} + P_{tr}^{l'}P_s^{w'} T_{c,w})$,
$S_{idle} = P_{tr}^{w'}P_{tr}^{l'}\sigma_{idle}$, $$S_{cross} = (P_{tr}^w P_{tr}^l (P_s^w P_s^l + P_s^w P_s^{l'} + P_s^{w'} P_s^l))T_{c,m} \quad (14)$$

and
$P_{tr}^{w'} = (1-P_{tr}^w); P_{tr}^{l'} = (1-P_{tr}^l),$
$P_s^{w'} = (1-P_s^w); P_s^{l'} = (1-P_s^l),$ The parameters mentioned in above Para [0058] may be calculated from know parameters according to equation (15) as illustrated below where $T_{Header}$, $T_{payload}$, and $T_{ACK}$ are the transmission times required for transmitting the header, payload and acknowledgement and $\delta$ is the propagation delay.

$$T_{s,w} = SIFS + T_{Header} + T_{payload} + \delta + DIFS + T_{ACK} + \delta,$$

$$T_{c,w} = DIFS + T_{Header} + T_{payload} + \delta,$$

$$T_{s,l} = DIFS + T_{payload} + \delta,$$

$$T_{c,l} = 0 \quad (15)$$

The instant method and system have been tested using Matlab and NS-3 simulations using experimental setup wherein an indoor area already deployed with WiFi nodes at random locations is considered. Further for the simulation observations linear back-off mechanism for LAA in NS-3 simulator is implemented.

In accordance with the experimental setup implemented, WiFi stations are all configured to use IEEE 802.11n standards using 5 GHz band with channel number 36. For WiFi, EDCA mechanism with only Best Effort type of access category is being considered. This ensures the simulation model (EDCA) equivalent to the analytic model (DCF). LTE eNB (LAA BS) also uses 5 GHz unlicensed band in downlink by setting EARFCN number to 255444 (5.18 GHz). The Radio Resource Control (RRC) messages are modelled to use ideal RRC in the simulation so that they are not transmitted through the channel. The control signals in LAA are exchanged in licensed bands; they do not interfere WiFi users. The PHY layer and the MAC layer functionalities of LTE eNB are modified to include the proposed LBT procedure in NS-3 LTE module. The embodiment also introduces sensing for the WiFi transmissions by LAA in Physical and MAC layers for a fixed CCA period. The maximum channel occupancy period is also included in LAA MAC module for continuously scheduling for a fixed period once the channel is grabbed. Both LAA BS and WiFi APs transmit User Datagram Protocol (UDP) packets of fixed size to their users after contending for the channel. Various simulation parameters used for the simulation are specified in Table I below.

TABLE I

SIMULATION PARAMETERS

| Parameter | Values |
| --- | --- |
| BS/AP Tx Power | 18 dBm |
| UE Tx Power | 18 dBm |
| Frequency | 5.18 GHz |
| Channel Bandwidth | 20 MHz |
| Packet Size | 1000 bytes |
| Slot Duration | 9 μs |
| SIFS | 16 μs |
| EIFS | 60 μs |
| Simulation Time | 14 s |

Further for the analytic performance comparison and performance evaluation through simulations two types of scenarios are considered (1) WiFi only—there are n (n varies from 1 to 16) number of WiFi Ps contending for channel and (2) WiFi-LAA—there are n−1 WiFi APs and one LAA BS. Sufficient number of simulation iterations have been conducted with 100 different seed values to have results with a confidence interval of 2% of the mean value with a confidence level of 95%.

Figure 6:
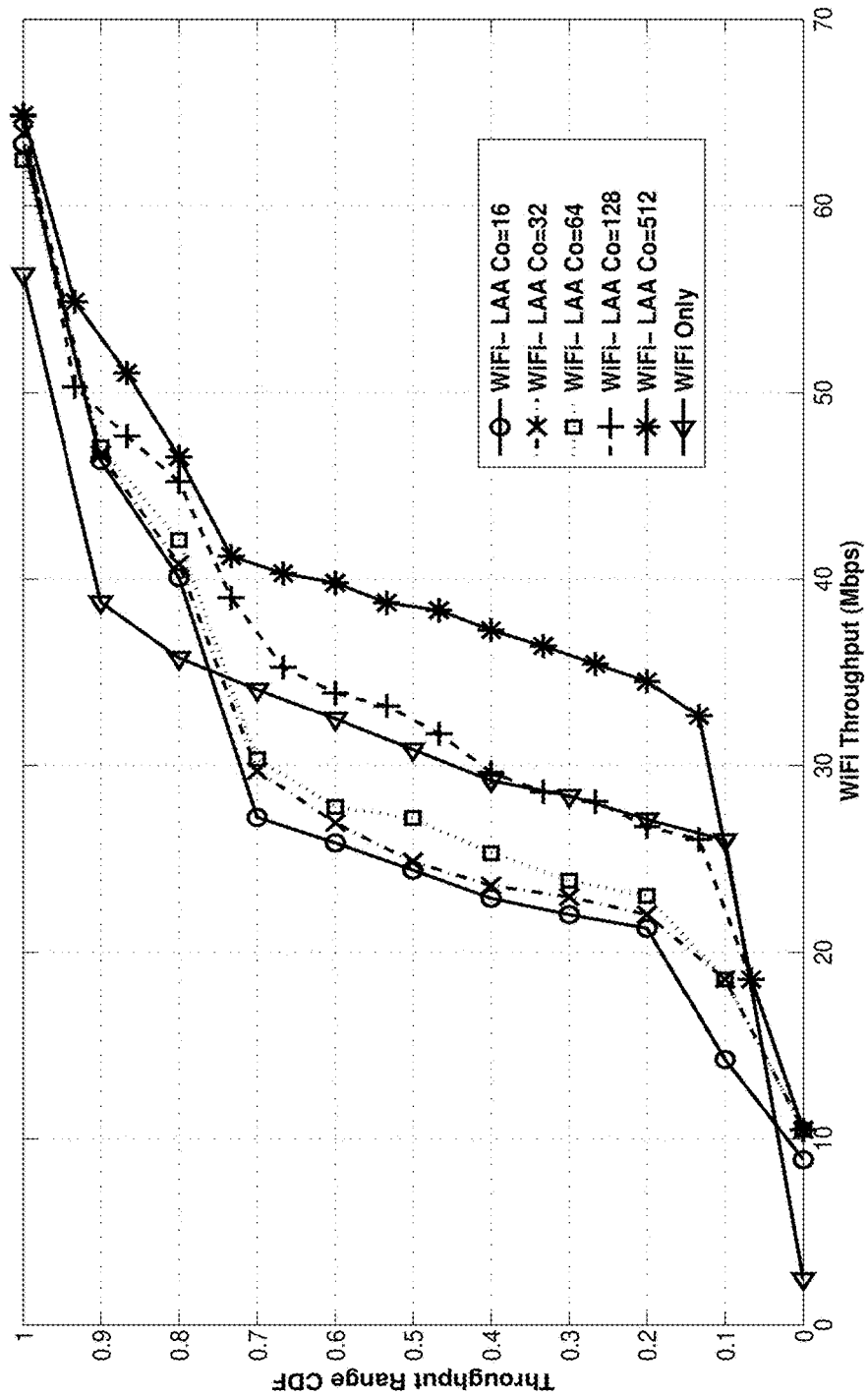
FIG. 6 shows a plot illustrating WiFi Channel Occupancy, in accordance with an embodiment of the present subject matter.
Figure 7:
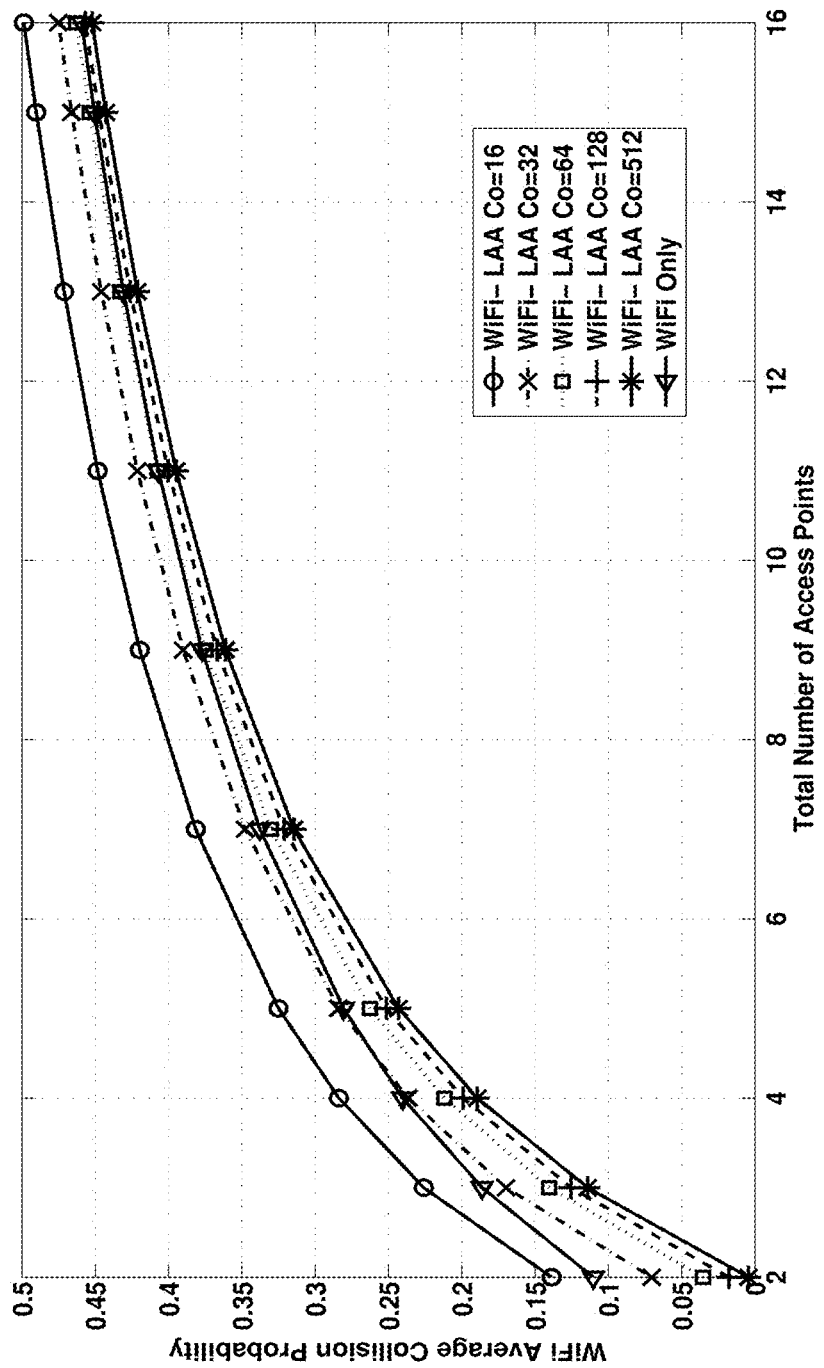
FIG. 7 shows a plot illustrating WiFi Collision Probability, in accordance with an embodiment of the present subject matter.

Referring now FIG. 6 to FIG. 9 the performance of the above two scenarios with varying maximum congestion window sizes is illustrated. As illustrated by FIG. 6 and FIG. 7 channel access probability of WiFi APs is improved (low collision probability) in co-existence as compared to WiFi only system with LAA congestion window size as 32 and above.

Figure 8:
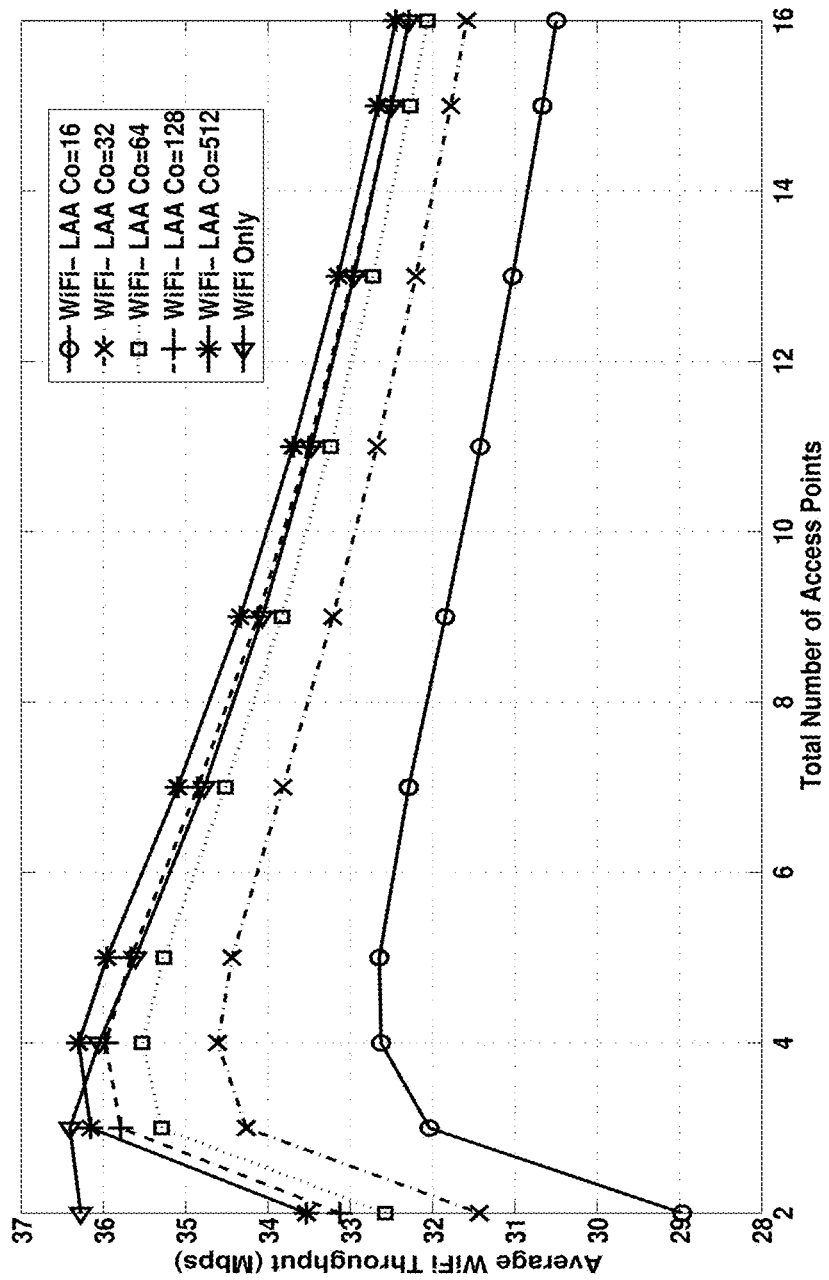
FIG. 8 shows a plot illustrating WiFi throughput, in accordance with an embodiment of the present subject matter.
Figure 9:
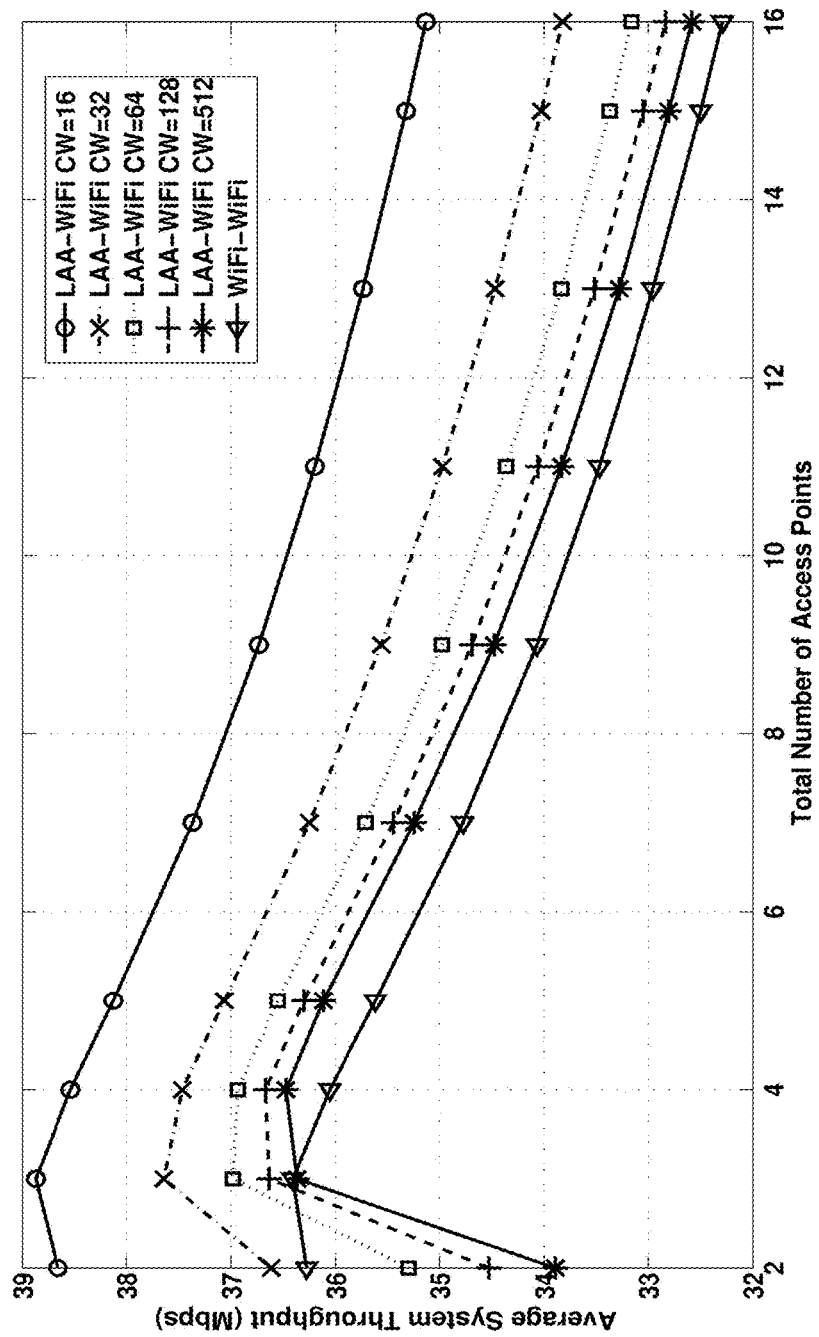
FIG. 9 shows a plot illustrating average system throughput, in accordance with an embodiment of the present subject matter.

Further as illustrated by FIG. 8 and FIG. 9 With increasing number of WiFi APs (increasing load), this trend also continues. Higher/lower channel access/collision probability also results in increased throughput for WiFi nodes as well as overall system throughput respectively. It may also be noted that with higher size, the chance of accessing the license-free channel for LAA BS is low. Moreover, LAA uses a centralized system. Therefore, instead of creating congestion in channel access, with higher LAA allows WiFi users to access the channel more and more resulting in throughput improvement due to co-existence.

The experimental simulation results are used for validating the analytical results obtained by implementing the method as disclosed herein. In scenario-1, four WiFi Aps are considered, whereas in scenario-2, three WiFi APs and a single LAA BS is considered for the above mentioned validation.

Figure 10:
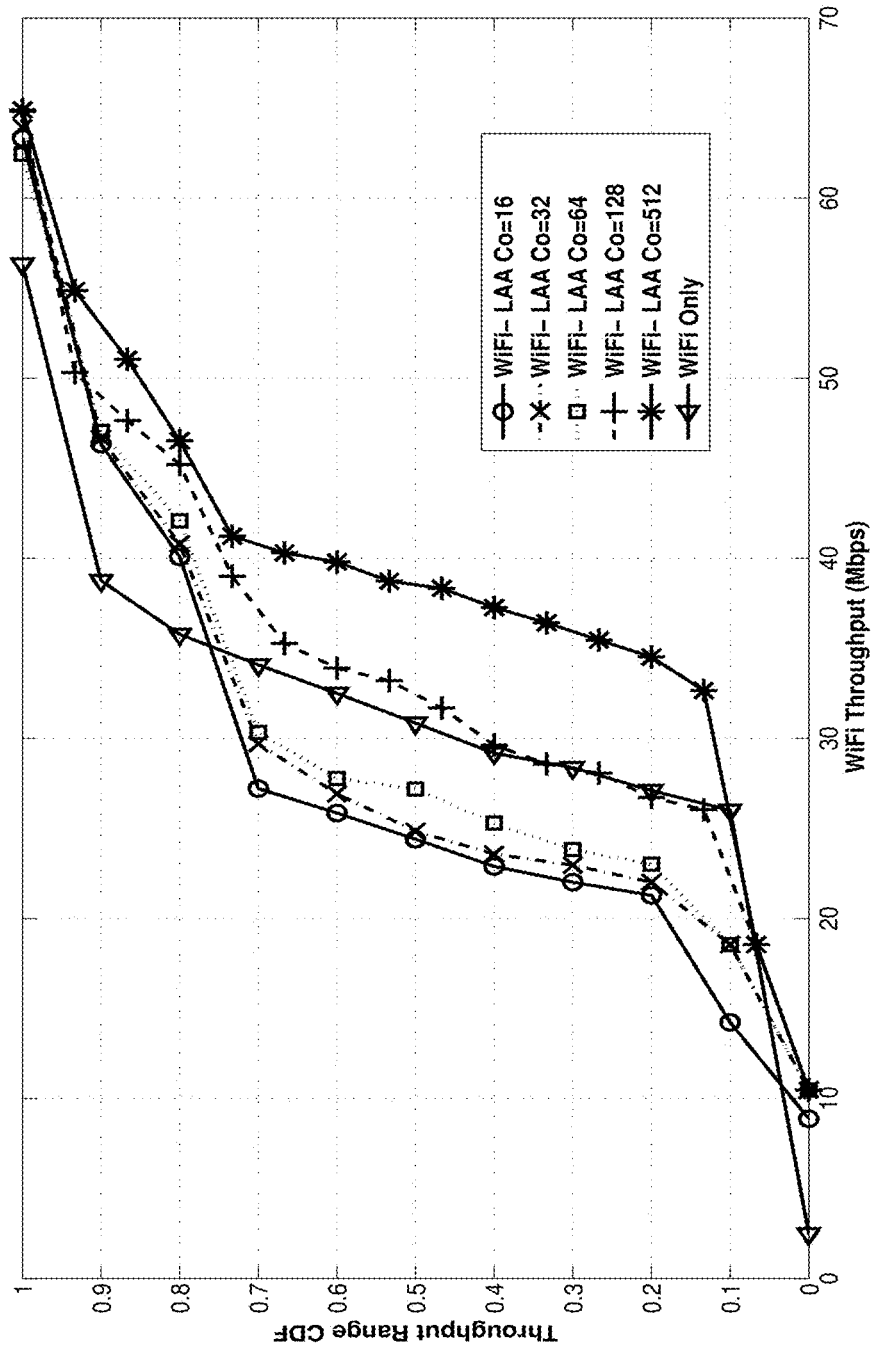
FIG. 10 shows a plot illustrating average WiFi throughput comparison, in accordance with an embodiment of the present subject matter.
Figure 11:
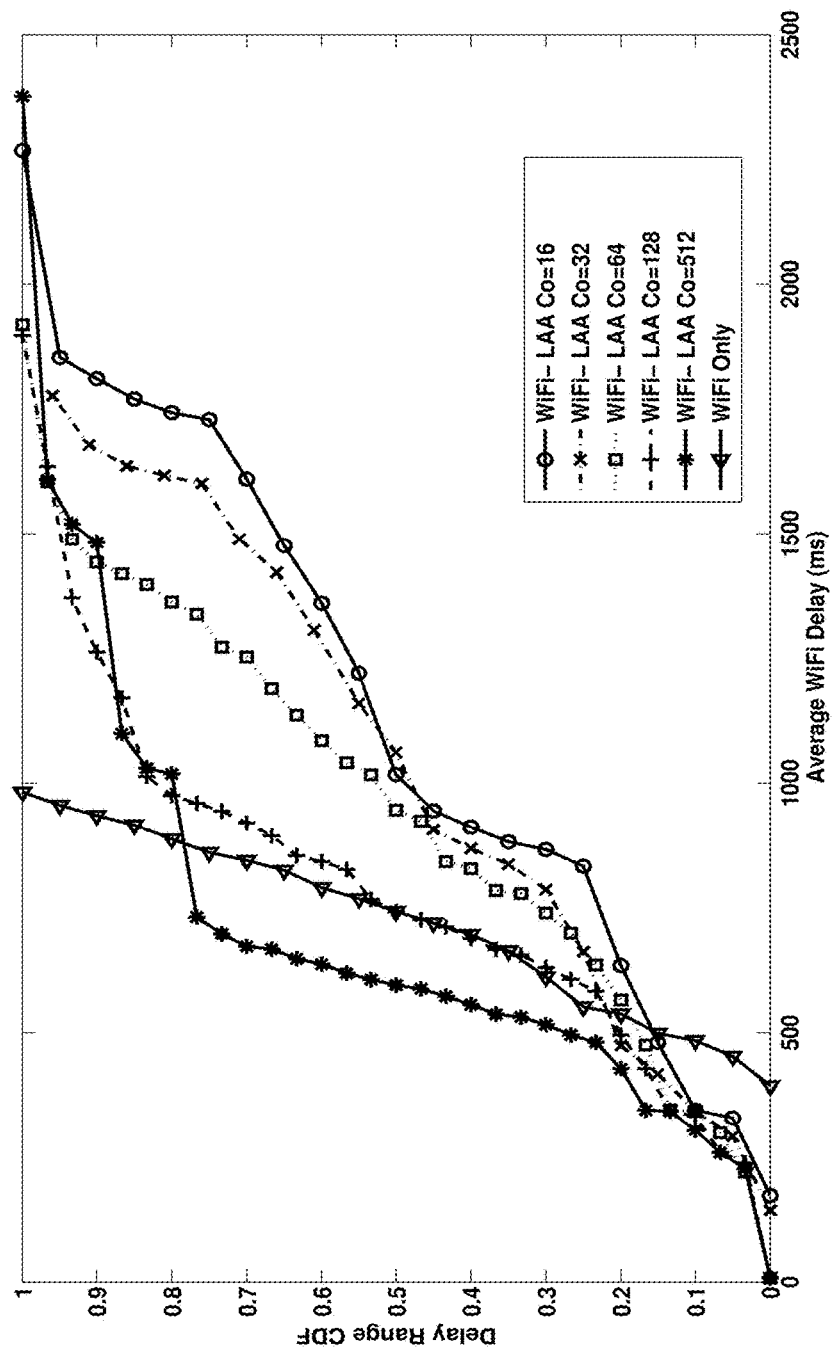
FIG. 11 shows a plot illustrating average WiFi delay comparison in accordance with an embodiment of the present subject matter.

The Cumulative Distributed Function (CDF) of the average throughput and delay performance of WiFi APs for both the scenarios are illustrated in plots shown in FIGS. 10 and 11 respectively with 100 different seed values. Similar to analytical results, FIG. 10 illustrates that with LAA value more than 32, co-existence performs better as compared to WiFi only system. Similarly delay performance is also improved as shown by illustration of FIG. 11.

Further by comparing FIG. 8 with FIG. 10, it may be observed that the analytical results match the experimental results. For example, from FIG. 8 it is observed that the analytical average throughput of WiFi only system is 36 Mbps for four APs, whereas with $C_0$=512, it is 36.3 Mbps. In comparison to this the simulation results in FIG. 10 indicate that WiFi only system throughput is in the range of 26-40 Mbps for the CDF of 0.1 to 0.9, whereas with $C_0$=512, it is in the range of 26-52 Mbps for the CDF of 0.1 to 0.9; mostly confined in 32 to 40 Mbps range.

Figure 12:
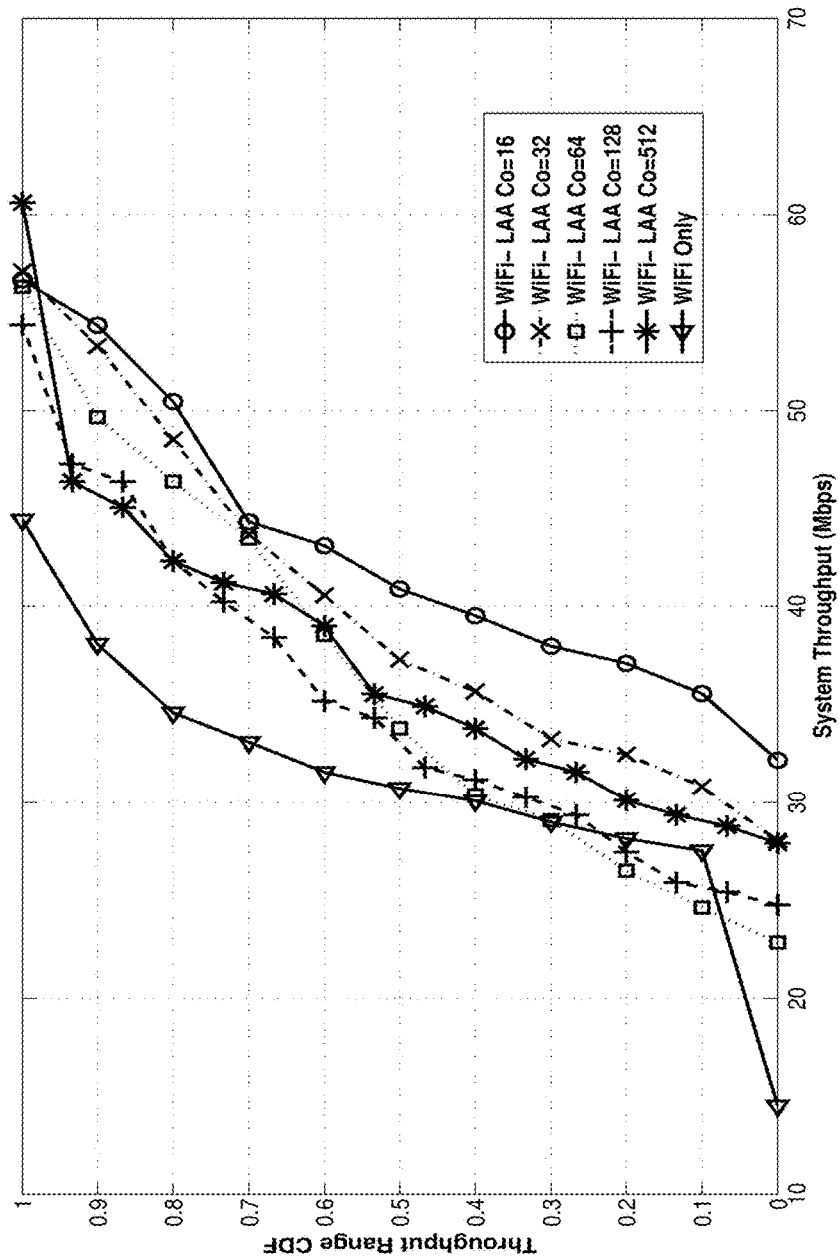
FIG. 12 shows a plot illustrating average system throughput comparison in accordance with an embodiment of the present subject matter.
Figure 13:
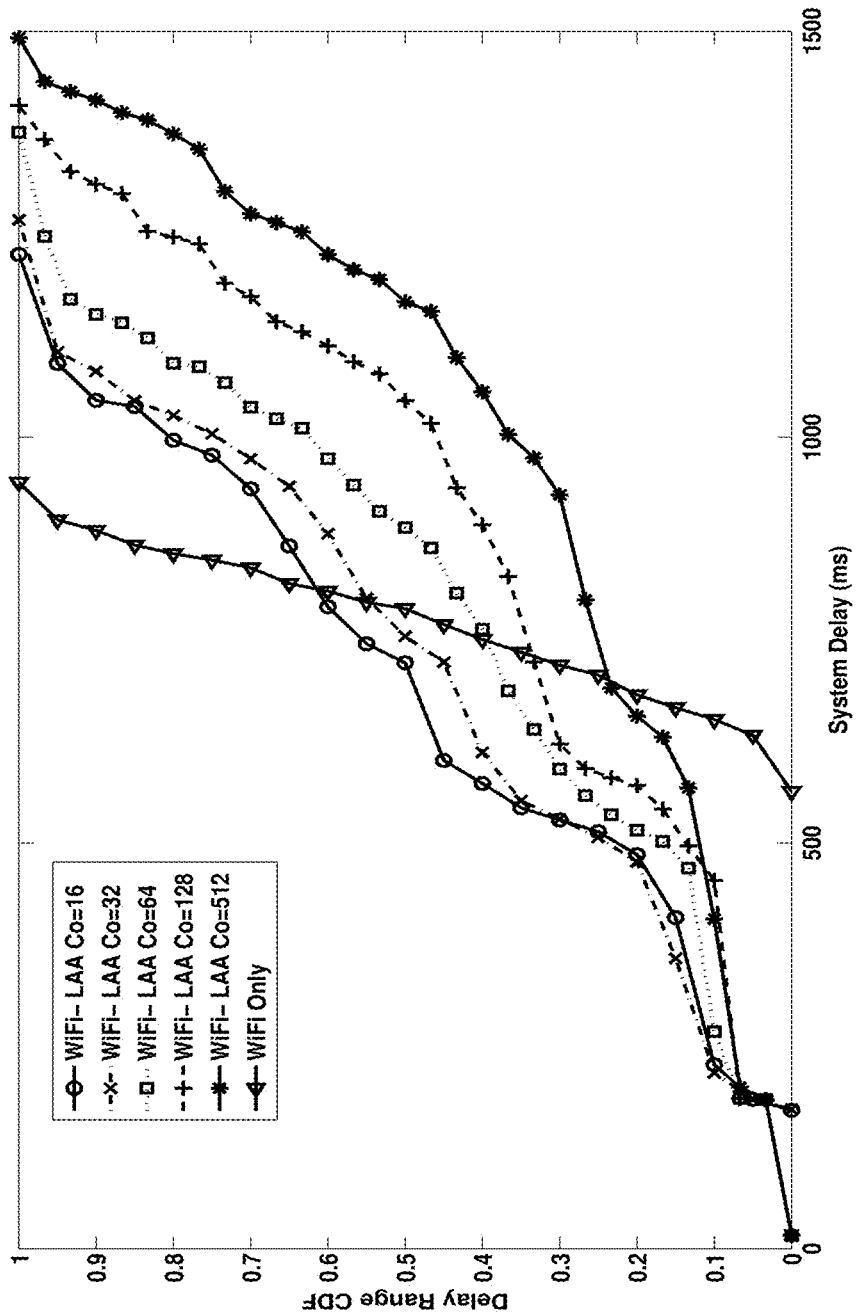
FIG. 13 shows a plot illustrating average system delay profile comparison in accordance with an embodiment of the present subject matter.

The performance of the disclosed system and method are further analyzed in terms of throughput and delay as shown in FIG. 12 and FIG. 13 respectively. From these figures, it may be observed that irrespective of values, the combined system with WiFi and LAA co-existance performs better as compared to WiFi only system. Therefore, that LAA not only proves as an improvement to LTE users, but also can improve the throughput of WiFi users.

It may be understood that the foregoing illustrations, embodiments, explanations and experimental data etc. is not intended to limit the scope of the instant application which is limited only by the following claims.

What is claimed is:

1. A method for sharing of unlicensed spectrum using listen before talk (LBT) technique; said method comprising processor implemented steps of:
   checking, via a Licensed Assisted Access (LAA) base station (BS), a buffer for data to be transmitted;
   sensing, via at least one sensor operatively coupled to the LAA BS, a channel for a clear channel assessment (CCA) period, wherein the CCA period is equal to Distributed Inter Frame Space period for Wi-Fi;
   entering, via the LAA BS, the LAA BS into a linear backoff stage by selecting a random number from fixed congestion window size, when the channel is sensed busy by the at least one sensor;
   scheduling, via the LAA BS, users and starting data transmission for a maximum channel occupancy period, wherein the maximum channel occupancy period is equal to a predefined channel occupancy period, when the channel is sensed free by the at least one sensor;
   releasing, via the LAA BS, the channel after the predefined channel occupancy period to be shared; and
   sensing, via the at least one sensor, the channel for the CCA period to transmit a second data in the buffer.

2. The method of claim 1, wherein the LAA BS enters into the linear backoff stage such that a backoff counter determines a duration for the LAA BS to remain in the linear backoff stage.

3. The method of claim 2, wherein the LAA BS enters into the linear backoff stage by selecting a uniform random number from [0, $C_0$−1] as the backoff counter such that $C_0$ is the fixed congestion window size and wherein the fixed congestion window size can be tuned based on usage of the channel.

4. The method of claim 1, wherein the predefined channel occupancy period is 7 ms.

5. A system (102) for sharing of unlicensed spectrum using listen before talk (LBT) technique, the system comprising:
   a Licensed Assisted Access (LAA) base station (BS) configured to check, a buffer for data to be transmitted;
   at least one sensor operatively coupled to the LAA BS and configured to sense a channel for a clear channel assessment (CCA) period, wherein the CCA period is equal to Distributed Inter Frame Space period for Wi-Fi;
   the LAA BS further configured to enter the LAA BS into a linear backoff stage by selecting a random number from fixed congestion window size, when the channel is sensed busy by the at least one sensor;
   the LAA BS further configured to schedule users and start data transmission for a maximum channel occupancy period, wherein the maximum channel occupancy period is equal to a predefined channel occupancy period, when the channel is sensed free by the at least one sensor;
   the LAA BS further configured to release the channel after the predefined channel occupancy period to be shared; and
   the LAA BS further configured to sense, via the at least one sensor, the channel for the CCA period to transmit a second data in the buffer.

6. The system according to claim 5, wherein the LAA BS enters into the linear backoff stage such that a backoff counter determines a duration for the LAA BS to remain in the linear backoff stage.

7. The system according to claim 6, the BS enters into the linear backoff stage by selecting a uniform random number from [0, $C_0$−1] as the backoff counter such that $C_0$ is the fixed congestion window size and wherein the fixed congestion window size can be tuned based on usage of the channel.

8. A non-transitory computer readable information medium having embodied thereon a computer program for executing a method for sharing of unlicensed spectrum using listen before talk (LBT) technique, wherein the method comprises:
   checking, via a Licensed Assisted Access (LAA) base station (BS), a buffer for data to be transmitted;
   sensing, via at least one sensor operatively coupled to the LAA BS, a channel for a clear channel assessment (CCA) period, wherein the CCA period is equal to Distributed Inter Frame Space period for Wi-Fi;
   entering, via the LAA BS, the LAA BS into a linear backoff stage by selecting a random number from fixed congestion window size, when the channel is sensed busy by the at least one sensor;
   scheduling, via the LAA BS, users and starting data transmission for a maximum channel occupancy period wherein the maximum channel occupancy period is equal to a predefined channel occupancy period, when the channel is sensed free by the at least one sensor;
   releasing, via the LAA BS, the channel after the predefined channel occupancy period to be shared; and sensing, via the at least one sensor, the channel for the CCA period to transmit a second data in the buffer.

* * * * *